United States Patent
Woodworth et al.

(10) Patent No.: US 10,711,155 B2
(45) Date of Patent: Jul. 14, 2020

(54) ULTRADURABLE COATING COMPOSITION

(71) Applicant: PPG Industries Ohio, Inc., Cleveland, OH (US)

(72) Inventors: Brian E. Woodworth, Glenshaw, PA (US); Anthony M. Chasser, Allison Park, PA (US); Susan F. Donaldson, Allison Park, PA (US); John E. Schwendeman, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 105 days.

(21) Appl. No.: 15/848,263

(22) Filed: Dec. 20, 2017

(65) Prior Publication Data

US 2019/0185701 A1    Jun. 20, 2019

(51) Int. Cl.

| | |
|---|---|
| *C09D 167/02* | (2006.01) |
| *C08G 63/91* | (2006.01) |
| *C08G 63/685* | (2006.01) |
| *C09D 5/03* | (2006.01) |
| *C08J 3/24* | (2006.01) |
| *C09D 163/00* | (2006.01) |
| *C09D 167/00* | (2006.01) |
| *C08G 63/127* | (2006.01) |

(52) U.S. Cl.
CPC ......... *C09D 167/02* (2013.01); *C08G 63/127* (2013.01); *C08G 63/6854* (2013.01); *C08G 63/6856* (2013.01); *C08G 63/916* (2013.01); *C08J 3/244* (2013.01); *C09D 5/03* (2013.01); *C09D 163/00* (2013.01); *C09D 167/00* (2013.01); *C08G 2150/20* (2013.01); *C08J 2367/02* (2013.01)

(58) Field of Classification Search
CPC ............. C08G 18/68; C08G 2150/20; C08G 18/3203; C08G 63/6856; C09J 2421/006; C09D 167/00

See application file for complete search history.

(56) References Cited

U.S. PATENT DOCUMENTS

| | | | |
|---|---|---|---|
| 4,650,718 A | 3/1987 | Simpson et al. | |
| 4,681,811 A | 7/1987 | Simpson et al. | |
| 4,703,101 A | 10/1987 | Singer et al. | |
| 4,764,430 A | 8/1988 | Blackburn et al. | |
| 5,196,485 A | 3/1993 | McMonigal et al. | |
| 5,256,452 A | 10/1993 | McMonigal et al. | |
| 9,359,524 B2 * | 6/2016 | Breon | C09D 167/00 |
| 2012/0053291 A1 | 3/2012 | Saliya et al. | |
| 2013/0034741 A1 | 2/2013 | Mauer, III et al. | |
| 2015/0105518 A1 * | 4/2015 | Maksimovic | C09D 167/00 524/601 |
| 2017/0009081 A1 * | 1/2017 | Hirokami | C09D 5/03 |

FOREIGN PATENT DOCUMENTS

| | | | |
|---|---|---|---|
| DE | 102007057057 A1 | | 5/2009 |
| EP | 2072585 A1 | | 6/2009 |
| EP | 1192230 B1 | | 12/2009 |
| EP | 2035478 B1 | | 9/2015 |
| WO | WO 93/18079 | * | 9/1993 |
| WO | 0063265 | | 10/2000 |
| WO | WO 02/066541 | * | 8/2002 |

* cited by examiner

Primary Examiner — Gregory Listvoyb
(74) Attorney, Agent, or Firm — Michael J. Grese

(57) ABSTRACT

A coating composition includes: a polymer prepared from a reaction mixture including: a hydroxyl functional prepolymer comprising a reaction product of a prepolymer mixture and a non-aromatic anhydride. The polymer includes at least two functional groups selected from hydroxyl groups, carboxyl groups and combinations thereof. The polymer includes 10-40 weight % of structural units derived from benzoic acid or substituted benzoic acid and greater than 15 weight % of structural units derived from a polyol having at least three hydroxyl groups based on the total weight of the polymer. A substrate at least partially coated with a coating composition and a method of preparing a coating composition are also disclosed.

18 Claims, No Drawings

ULTRADURABLE COATING COMPOSITION

FIELD OF THE INVENTION

The present invention relates to a coating composition, a substrate at least partially coated with a coating composition, and a method of preparing a coating composition.

BACKGROUND OF THE INVENTION

Substrates coated with coating compositions are oftentimes exposed to natural weather conditions for long periods of time. For instance, automotive parts and trim may be coated with a coating composition, and these automotive substrates may be subjected to outdoor conditions over their entire lifetime. Such conditions can degrade the cured coating composition over time.

SUMMARY OF THE INVENTION

The present invention is directed to coating composition including: a polymer prepared from a reaction mixture including: (i) a hydroxyl functional prepolymer comprising a reaction product of a prepolymer mixture comprising: (A) (a) a polyol having at least three hydroxyl groups; (b) benzoic acid or substituted benzoic acid; and (c) a polyacid, ester or anhydride thereof; or (B) (d) the reaction product of (a) a polyol having at least three hydroxyl groups with (b) benzoic acid or substituted benzoic acid; and (c) a polyacid; or (C) (e) the reaction product of (a) a polyol having at least three hydroxyl groups with (c) a polyacid, ester or anhydride thereof; and (b) benzoic acid or substituted benzoic acid; and (ii) a non-aromatic anhydride, wherein the polymer includes at least two functional groups selected from hydroxyl groups, carboxyl groups and combinations thereof, and the polymer includes 10-40 weight % of structural units derived from component (b) and greater than 15 weight % of structural units derived from component (a) based on the total weight of the polymer.

The present invention is also directed to a substrate at least partially coated with a coating composition including: a polymer prepared from a reaction mixture including: (i) a hydroxyl functional prepolymer comprising a reaction product of a prepolymer mixture comprising: (A) (a) a polyol having at least three hydroxyl groups; (b) benzoic acid or substituted benzoic acid; and (c) a polyacid, ester or anhydride thereof; or (B) (d) the reaction product of (a) a polyol having at least three hydroxyl groups with (b) benzoic acid or substituted benzoic acid; and (c) a polyacid; or (C) (e) the reaction product of (a) a polyol having at least three hydroxyl groups with (c) a polyacid, ester or anhydride thereof; and (b) benzoic acid or substituted benzoic acid; and (ii) a non-aromatic anhydride, wherein the polymer includes at least two functional groups selected from hydroxyl groups, carboxyl groups and combinations thereof, and the polymer includes 10-40 weight % of structural units derived from component (b) and greater than 15 weight % of structural units derived from component (a) based on the total weight of the polymer.

The present invention is also directed to a method of preparing a coating composition including: mixing a hydroxyl functional prepolymer (i) including a reaction product of a prepolymer mixture including: (A) (a) a polyol having at least three hydroxyl groups; (b) benzoic acid or substituted benzoic acid; and (c) a polyacid, ester or anhydride thereof; or (B) (d) the reaction product of (a) a polyol having at least three hydroxyl groups with (b) benzoic acid or substituted benzoic acid; and (c) a polyacid; or (C) (e) the reaction product of (a) a polyol having at least three hydroxyl groups with (c) a polyacid, ester or anhydride thereof; and (b) benzoic acid or substituted benzoic acid; with a non-aromatic anhydride (ii) to form a polymer having at least two functional groups selected from hydroxyl groups, carboxyl groups and combinations thereof and 10-40 weight % of structural units derived from component (b) and greater than 15 weight % of structural units derived from component (a) based on the total weight of the polymer.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" acid, "a" prepolymer, and the like refer to one or more of these items. Also, as used herein, the term "polymer" may refer to prepolymers, oligomers, and both homopolymers and copolymers. The term "resin" is used interchangeably with "polymer."

As used herein, the transitional term "comprising" (and other comparable terms, e.g., "containing" and "including") is "open-ended" and is used in reference to compositions, methods, and respective component(s) thereof that are essential to the invention, yet open to the inclusion of unspecified matter.

The present invention is directed to coating composition including: a polymer prepared from a reaction mixture including: (i) a hydroxyl functional prepolymer comprising a reaction product of a prepolymer mixture comprising: (A)

(a) a polyol having at least three hydroxyl groups; (b) benzoic acid or substituted benzoic acid; and (c) a polyacid, ester or anhydride thereof; or (B) (d) the reaction product of (a) a polyol having at least three hydroxyl groups with (b) benzoic acid or substituted benzoic acid; and (c) a polyacid; or (C) (e) the reaction product of (a) a polyol having at least three hydroxyl groups with (c) a polyacid, ester or anhydride thereof; and (b) benzoic acid or substituted benzoic acid; and (ii) a non-aromatic anhydride, wherein the polymer includes at least two functional groups selected from hydroxyl groups, carboxyl groups and combinations thereof, and the polymer includes 10-40 weight % of structural units derived from component (b) and greater than 15 weight % of structural units derived from component (a) based on the total weight of the polymer.

As previously discussed, the coating composition may include a prepolymer including a reaction product of a prepolymer mixture that includes components (a)-(c). The prepolymer mixture may be produced any number of ways. In one instance, the prepolymer mixture may be prepared by mixing components (a), (b), and (c) together simultaneously. In one instance, the prepolymer mixture may be prepared by mixing components (a) and (b) together to form reaction product (d) and then mixing reaction product (d) with component (c) to form the prepolymer mixture. In one instance, the prepolymer mixture may be prepared by mixing components (a) and (c) together to form reaction product (e) and then mixing reaction product (e) with component (b) to form the prepolymer mixture.

Component (a) may be a tri-functional or higher polyol. Tri-functional or higher polyol means that the polyol has at least three hydroxyl groups. Suitable examples of a tri-functional or higher polyol include pentaerythritol, trimethylolethane (TME), trimethylolpropane (TMP), tris(2-hydroxyethyl)isocyanurate (THEIC), and/or mixtures thereof. Structural units derived from component (a) may comprise at least 15 weight %, such as at least 20 weight %, at least 25 weight %, at least 30 weight %, at least 35 weight %, at least 40 weight %, at least 45 weight %, or at least 50 weight % of the polymer, based on total weight of the polymer. Structural units derived from component (a) may comprise up to 75 weight %, such as up to 70 weight %, up to 60 weight %, up to 50 weight %, or up to 40 weight % of the polymer, based on total weight of the polymer. Structural units derived from component (a) may comprise a range of over 15 to 75 weight %, such as 20 to 75 weight %, 20 to 60 weight %, 20 to 50 weight %, 20 to 45 weight %, 20 to 40 weight %, 25 to 75 weight %, 25 to 70 weight %, 25 to 60 weight %, 25 to 50 weight %, 25 to 40 weight %, 35 to 75 weight %, 35 to 70 weight %, 35 to 60 weight %, 35 to 50 weight %, or 35 to 40 weight % of the polymer, based on total weight of the polymer.

Component (b) may include benzoic acid or substituted benzoic acid. By "substituted" it is meant that one or more of the aromatic hydride groups is substituted with one or more alkyl, aryl, hydroxyl, and/or halide group. Examples of substituted benzoic acid include t-butyl benzoic acid and hydroxybenzoic acids such as 4-hydroxybenzoic acid and salicylic acid. Structural units derived from component (b) may comprise at least 10 weight %, such as at least 15 weight %, at least 20 weight %, at least 25 weight %, or at least 30 weight % of the polymer, based on total weight of the polymer. Structural units derived from component (b) may comprise up to 40 weight %, such as up to 35 weight %, up to 30 weight %, up to 25 weight %, or up to 20 weight % of the polymer, based on total weight of the polymer. Structural units derived from component (b) may comprise a range of 10 to 40 weight %, such as 20 to 40 weight %, 20 to 35 weight %, 20 to 30 weight %, 20 to 25 weight %, 25 to 40 weight %, 25 to 35 weight %, or 25 to 30 weight % of the polymer, based on total weight of the polymer.

Component (c) may include a polyacid, ester or anhydride thereof. The polyacid may be isophthalic acid, adipic acid, azelaic acid, sebacic acid, succinic acid, maleic acid, fumaric acid, glutaric acid, decanoic acid, dodecanoic diacid, cyclohexanedioic acid, hydrogenated C36 dimer fatty acids, esters or anhydrides thereof, and/or mixtures thereof. The polyacid and/or the reaction mixture may be substantially free of, may be essentially free of, or may be completely free of non-UV durable polyacid, such as: trimellitic acid, phthalic acid, terephthalic acid, pyromelletic acid, trimesic acid, naphthalene dicarboxylic acid and substitutions thereof, esters or anhydrides thereof, and/or mixtures thereof. By "substitutions thereof" it is meant that one or more of the aromatic hydride groups is substituted with one or more alkyl, aryl, hydroxyl, and/or halide group. By "non-UV durable" it is meant that a polymer incorporating such a polyacid fails to maintain gloss upon exposure to UV radiation, for example, from sunlight or QUV accelerated weather testing (from Q-Lab Corporation (Westlake, Ohio)) (<50% gloss retention after 1500 kJ of UV radiation (WOM)/or 12 months in South Florida exposure). By "substantially free" it is meant that the polymers contain less than 5 weight % of the component. By "essentially free" it is meant that the polymers contain less than 1 weight % of the component. By "completely free" it is meant that the polymers contain less than 0.1 weight % of the component.

Structural units derived from component (c) may comprise at least 15 weight %, such as at least 20 weight %, or at least 25 weight % of the polymer, based on total weight of the polymer. Structural units derived from component (c) may comprise up to 35 weight %, such as up to 30 weight %, or up to 25 weight % of the polymer, based on total weight of the polymer. Structural units derived from component (c) may comprise a range of 15-30 weight %, such as 15-35 weight %, 15-25 weight %, 15-20 weight %, 20-35 weight %, 20-30 weight %, 20-25 weight %, 25-35 weight %, or 25-30 weight % of the polymer, based on total weight of the polymer.

In preparation of the prepolymer, at least two of components (a), (b), or (c) may be reacted to form an intermediate resin. The intermediate resin may then be reacted with at least one of components (a), (b), or (c) to produce the prepolymer. For example, an intermediate resin may be prepared by a reaction mixture of a trifunctional or higher polyol (a) and substituted or unsubstituted benzoic acid (b). The intermediate resin may then be reacted with a polyacid (c) to produce a prepolymer. The prepolymer (i) may be substantially free of, essentially free of, or completely free of the non-aromatic anhydride (ii). Preparation of the prepolymer (i) prior to mixture with the non-aromatic anhydride (ii) may avoid gelation of the polymer. The non-aromatic anhydride may be added to the prepolymer so as to endcap the prepolymer. For example, the prepolymer may include a free hydroxyl group, such that the non-aromatic anhydride reacts with the free hydroxyl group so as to endcap the prepolymer and form the polymer.

Suitable non-aromatic anhydrides include hexahydrophthalic anhydride (HHPA), succinic anhydride, methyl HHPA, and/or maleic anhydride. In some examples, the non-aromatic anhydride may be different from component (c). In other examples, the non-aromatic anhydride may be the same as component (c). The non-aromatic anhydride and component (c) may be the same if both are non-aromatic anhydrides; however component (c) and the non-aromatic anhydride may be added at separate times during the reaction (component (c) is reacted with component (a) and/or (b), or a reaction product thereof to form a prepolymer, and then the non-aromatic anhydride, which is the same as component (c), is added to react with the prepolymer). Structural units derived from the non-aromatic anhydride may comprise at least 10 weight %, such as at least 11%, at least 15 weight %, or at least 20 weight % of the polymer, based on total weight of the polymer. Structural units derived from the non-aromatic anhydride may comprises up to 25 weight %, such as up to 20 weight %, or up to 15 weight % of the polymer, based on total weight of the polymer. Structural units derived from the non-aromatic anhydride may comprise a range of 10 to 25 weight %, such as 10 to 20 weight %, 10 to 15 weight %, 11 to 25 weight %, 11 to 20 weight %, 11 to 15 weight %, 15 to 25 weight %, 15 to 20 weight %, or 20 to 25 weight % of the polymer, based on total weight of the polymer. An effective amount the non-aromatic anhydride may be added to the reaction mixture such that at least 35% of the free hydroxyl groups of the prepolymer react with the non-aromatic anhydride, such as at least 40%, at least 45%, at least 50%, at least 55%, at least 60%, at least 65%, at least 70%, at least 75%, at least 80%, at least 85%, at least 90%, or at least 95%.

The resulting polymer produced from reaction of the prepolymer with the non-aromatic anhydride may be at least difunctional. By "difunctional" it is meant that the polymer includes at least two functional groups selected from hydroxyl groups, carboxyl groups, and combinations thereof. The polymer may be a component of a coating composition, with the coating composition being a powder coating composition. The polymer may be dissolved in a solvent and sprayed onto a substrate as a liquid coating composition. The polymer may be a branched polymer. The polymer may be acid functional, as measured by ASTM D1639. By "acid functional" it is meant that the polymer includes at least one functional groups selected from hydroxyl groups, carboxyl groups, and combinations thereof.

The resulting polymer including the prepolymer and the non-aromatic anhydride may have a weight average molecular weight (Mw) of 5,000 to 25,000, as measured by gel permeation chromatography was used with tetrahydrofuran solvent and polystyrene standards. The polymer may have a Mw of 5,000 to 20,000, 5,000 to 15,000, 6,000 to 25,000, 6,000 to 20,000, 6,000 to 15,000, 6,000 to 10,000, 7,000 to 25,000, 7,000 to 20,000, 7,000 to 15,000, 7,000 to 10,000, 10,000 to 20,000, 10,000 to 15,000, or 9,000 to 23,000. The polymer may have a number average molecular weight (Mn) up to 5,000, such as up to 3,000 or up to 2,000, as measured by gel permeation chromatography was used with tetrahydrofuran solvent and polystyrene standards.

The coating composition of the present invention includes the polymer and may further include a cross-linker. Suitable cross-linkers include hydroxyl alkyl amides, tris-glyciylisocyanurate (TGIC), glycolurils, glycidyl methacrylate (GMA) acrylic, an epoxy resin (e.g., an epoxy resin comprising a glycidylester mixture (e.g., ARALDITE® PT 910 from Huntsman Corporation, The Woodlands, Tex.)), aminoplast resins (e.g., benzoguanamine or melamine), oxazoline, blocked isocyanates, and/or mixtures thereof. The cross-linker may include TGIC and/or N,N,N'N'-tetrakis (2-hydroxyethyl) hexanediamide (PRIMID® XL552).

The coating composition may be prepared by mixing the prepolymer (the reaction product of the prepolymer mixture having components (a)-(c) as previously described) with the non-aromatic anhydride to form the polymer. The non-aromatic anhydride may be mixed with the prepolymer after the prepolymer is fully prepared, such that the prepolymer does not include the non-aromatic anhydride.

The coating compositions of the present invention may be prepared by standard methods known in the art. For example, the components may be first thoroughly mixed to ensure spatial homogeneity of the ingredients. The composition may then be intimately melt kneaded in an extruder. Common zone temperatures during extrusion range from 40° C. to 125° C., such as 45° C. to 100° C. The exiting extrudate may then be rapidly cooled to minimize polymerization. The resulting chip can then be micronized into powder with an average particle size of 0.1 to 300 microns, such as 1 to 100 microns. Comminution can be accomplished, for example, by air-classifying mills, impact mills, ball mills, or other fracture-induced mechanisms. Post additives that improve fluidization of the powder mass and/or improve the resistance to impact fusion may be incorporated into the final product before or after micronization.

The coating composition may include various additives. Non-limiting examples of additives that can be used with the coating compositions of the present invention include: colorants (e.g., pigments and/or dyes), plasticizers, abrasion resistant particles, corrosion resistant particles, corrosion inhibiting additives, fillers including, but not limited to, clays, inorganic minerals, anti-oxidants, hindered amine light stabilizers, UV light absorbers and stabilizers, surfactants, flow and surface control agents, thixotropic agents, organic co-solvents, reactive diluents, catalysts, reaction inhibitors, and other customary auxiliaries.

The coating composition, once prepared, may be applied to at least a portion of a substrate and cured to form a coating. The powder coating compositions of the present invention can be applied to a substrate in any number of ways, most often by electrostatic spraying. The powder coating may be applied in a single sweep or in several passes to provide a film having a thickness after cure of from about 1 to 10 mils (25 to 250 microns), usually about 2 to 4 mils (50 to 100 microns). After application, the present compositions may be cured by heating to a temperature of 120° C. to 220° C., such as 140° C. to 190° C., for a period ranging from 3 minutes to 30 minutes, such as 15 to 20 minutes. Heating can be effected by any means known in the art, typically by placing the coated substrate in an oven. IR radiation can also be used to heat cure the coated substrates. Other standard methods for coating application can also be employed, such as such as electrocoating, dipping, rolling, brushing, and the like.

The compositions of the present invention can be used alone, or in combination with one or more other compositions, such as a coating system having two or more layers. For example, the compositions of the present invention can comprise a colorant or not and can be used as a primer, basecoat, and/or top coat. For substrates coated with multiple coatings, one or more of those coatings can be coatings as described herein. The coating composition may be used as an outermost layer on the substrate to provide durability to the substrate. The coating composition may be applied over a primer layer, as previously mentioned, or may be applied directly to the substrate itself, e.g., direct to metal.

The composition can be a clearcoat. A clearcoat will be understood as a coating that is substantially transparent or translucent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is known in the coatings art.

The composition may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, boats, ships, airplanes, helicopters and the like. It will be appreciated that the portion of the vehicle that is coated according to the present invention may vary depending on why the coating is being used. When used as a colored basecoat or monocoat, the present coatings will typically be applied to those portions of the vehicle that are visible such as the roof, hood, doors trunk lid and the like of a car, but may also be applied to other areas such as inside the trunk, inside the door and the like especially when the compositions are formulated as sealants or adhesives; for example, the compositions can be formulated so as to have a viscosity such that they provide sound and/or vibration damping to a vehicle. The present compositions can also be applied to those portions of the vehicle that are in contact with the driver and/or passengers, such as the steering wheel, dashboard, gear shift, controls, door handle and the like. Clearcoats will typically be applied to the exterior of a vehicle.

The substrate may be any suitable material. For example, the substrate may be metallic or non-metallic. Metallic substrates may include, but are not limited to, tin, steel (including stainless steel, electrogalvanized steel, cold rolled steel, and hot-dipped galvanized steel, among others), aluminum, aluminum alloys, zinc-aluminum alloys, steel coated with a zinc-aluminum alloy, or aluminum plated steel. The metallic substrates may also further include a metal pretreatment coating, also referred to as a conversion coating. Examples of suitable pretreatment compositions include, but are not limited to, compositions that contain zinc phosphate, iron phosphate, or chromium-containing components. Other examples of suitable pretreatment coatings include, but are not limited to, thin-film pretreatment coatings, which include compositions such as a zirconium or titanium-containing components. The metal pretreatment coating may also include a sealer, such as a chromate or non-chromate sealer. The metallic substrates may also be coated with a primer such as a cationic electro-coat primer.

The metallic substrate may be an automotive component, such as an automotive trim. Automotive trim may include, but not be limited to, materials used in vehicle roof racks, wiper arms, running boards, and pillars. For example, the substrate may be aluminum used for architectural extrusion and metal for outdoor equipment, such as lawn and garden equipment or construction equipment.

The substrate may be a metallic or non-metallic substrate subjected to outdoor conditions over long periods of time. The substrate may be any substrate that would benefit from protection against exterior UV radiation, as the coating composition may provide exterior UV durability. The substrate may also include heavy duty equipment, machinery, vehicles, or other outdoor equipment that typically experiences outdoor conditions.

Non-metallic substrates may include polymeric materials. Suitable polymeric materials for the substrate may include plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylonitrile butadiene styrene (PC/ABS), or polyamide. Other non-metallic substrates may include glass, wood, wood veneer, wood composite, particle board, medium density fiberboard, cement, stone, paper, cardboard, textiles, leather, both synthetic and natural, and the like. Non-metallic substrates may also include a treatment coating that is applied before application of the coating, which increases the adhesion of the coating to the substrate.

Other non-limiting examples of suitable substrates include other automotive substrates, marine substrates, industrial substrates, packaging substrates, lumber, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like.

When the coating is applied to the substrate and cured to form a coating, the cured coating may exhibit enhanced durability properties. For example, the coating may exhibit a gloss retention of at least 90% at 4000 hours (h), according to SAE Standard J2527, as performed with an Atlas Weather-Ometer with daylight filters, with the data reported as % gloss retention at 20 degree gloss measurement. The coating may exhibit a gloss retention of at least 80%, such as at least 90% or 95% at 4000 h, according to SAE Standard J2527, as performed with an Atlas Weather-Ometer with daylight filters, with the data reported as % gloss retention at 20 degree gloss measurement. The coating may exhibit a gloss retention of at least 50% at 5000 h, according to SAE Standard J2527, as performed with an Atlas Weather-Ometer with daylight filters, with the data reported as % gloss retention at 20 degree gloss measurement, such as at least 55%, at least 60%, at least 65%, at least 70%, at least 75%, at least 80%, at least 85%, at least 90%, or at least 95%.

The following examples are presented to exhibit the general principles of the invention. The invention should not be considered as limited to the specific examples presented. All parts and percentages in the examples are by weight unless otherwise indicated.

Example 1

Part A: Intermediate Resin

An intermediate resin was prepared by adding a total of 1,125.6 grams of pentaerythritol (38.27 weight % based on total solids), 1,815.7 grams of benzoic acid (61.73 weight % based on total solids), 141.0 grams of xylene, 2.94 grams of butylstannoic acid, and 1.47 grams of triphenyl phosphite to a suitable reaction vessel equipped with a stirrer, temperature probe, and Dean-Stark trap with a condenser, under a nitrogen atmosphere. The contents of the reactor were gradually heated to 180° C. with continuous removal of water distillate beginning at about 167° C. The temperature of the reaction mixture was held at 180° C. until about 265.3 grams of water had been collected and the acid value of the reaction mixture was 1.08 mg KOH/g sample. The xylene was then removed via vacuum distillation at 180° C. This intermediate resin had a measured percent solids (110°

C./hour) of about 100%, an acid value of 1.01 mg KOH/g sample, and a hydroxyl value of 377.6 mg KOH/g sample.

Part B: Polymer

A prepolymer was prepared by adding a total of 1,036.2 grams of the intermediate resin from Example 1A, 37.1 grams of neopentyl glycol, 422.0 grams of isophthalic acid, 1.5 grams of butylstannoic acid and 1.5 grams of triphenyl phosphite to a suitable reaction vessel equipped with a stirrer, temperature probe, a glycol recovery distillation setup (empty column with packed column on top and distillation head connected to a water cooled condenser), and a nitrogen sparge. The contents of the reactor were gradually heated to 235° C. with continuous removal of water distillate beginning at about 190° C. The temperature of the reaction mixture was held at 235° C. until about 68.9 grams of water had been collected and the acid value of the reaction mixture was 2.1 mg KOH/g sample.

The contents of the reactor (with prepolymer) were cooled to 120° C. and 370.8 grams of hexahydrophthalic anhydride was added to prepare a polymer. The reaction mixture was gradually heated to 150° C. in stages over 5 hours, at which time the anhydride peak at 1,790 cm$^{-1}$ in the infrared spectrum was essentially gone. The polymer was heated to 190° C. before pouring out. The polymer had a measured percent solids (110° C./hour) of about 99.7%, an acid value of 84.7 mg KOH/g sample, and a hydroxyl value of 18.1 mg KOH/g sample. Gel permeation chromatography was used with tetrahydrofuran solvent and polystyrene standards to determine a weight average molecular weight of 10,917.

Example 2

Part a: Prepolymer

A prepolymer was prepared by adding a total of 1,425.0 grams of tris(2-hydroxyethyl)isocyanurate (41.76 weight % based on total solids), 376.5 grams of neopentyl glycol (11.03 weight % based on total solids), 1203.8 grams of isophthalic acid (35.28 weight % based on total solids), 407.0 grams of benzoic acid (11.93 weight % based on total solids), 33 grams of xylene, 4.5 grams of butylstannoic acid, and 1.5 grams of triphenyl phosphite to a suitable reaction vessel equipped with a stirrer, temperature probe, and Dean-Stark trap with a condenser, under a nitrogen atmosphere. The contents of the reactor were gradually heated to 230° C. with continuous removal of water distillate beginning at about 175° C. The temperature of the reaction mixture was held at 230° C. until about 330 grams of water had been collected and the acid value of the reaction mixture was 4.93 mg KOH/g sample. The reaction mixture was cooled to 208° C. and the xylene was then removed via vacuum distillation. This prepolymer had a measured percent solids (150° C./hour) of about 99.1%, an acid value of 1.01 mg KOH/g sample, and a hydroxyl value of 100.2 mg KOH/g sample. Gel permeation chromatography was used with tetrahydrofuran solvent and polystyrene standards to determine a weight average molecular weight of 10,411.

Part B: Polymer

A polymer was prepared by adding a total of 1,400.0 grams of the prepolymer from Example 2A and 242.9 grams of succinic anhydride to a suitable reaction vessel equipped with a reflux condenser and a nitrogen blanket. The contents of the reactor were gradually heated to 167° C. in stages over 3 hours, at which time the anhydride peak at 1,790 cm$^{-1}$ in the infrared spectrum was essentially gone. The polymer was heated to 170° C. before pouring out. The polymer had a measured percent solids (150° C./hour) of about 97.9%, an acid value of 84.9 mg KOH/g sample, and a hydroxyl value of 7.9 mg KOH/g sample. Gel permeation chromatography was used with tetrahydrofuran solvent and polystyrene standards to determine a weight average molecular weight of 19,703.

Polymer Example 3

A prepolymer was prepared by adding a total of 495.4 grams of pentaerythritol, 792.8 grams of benzoic acid, 431.8 grams of isophthalic acid, 80.3 grams of Solvesso 100 solvent (commercially available from ExxonMobil Chemical (Houston, Tex.)), 0.9 grams of dibutyl tin oxide and 1.7 grams of triphenyl phosphite to a suitable reaction vessel equipped with a stirrer, temperature probe, and Dean-Stark trap with a condenser, under a nitrogen atmosphere. The contents of the reactor were gradually heated to 226° C. with continuous removal of water distillate beginning at about 174° C. The temperature of the reaction mixture was held at 226° C. until about 210 grams of water had been collected and the acid value of the reaction mixture was <1 mg KOH/g sample. The reaction mixture was cooled to 150° C. and the Solvesso 100 was then removed via vacuum distillation.

The contents of the reactor (the prepolymer) were cooled to 110° C. and 11.5 grams of Resiflow LV were added, followed by 257.6 grams of succinic anhydride to form a polymer. The reaction mixture was held at 110° C. for 10 hours, at which time the anhydride peak at 1,790 cm$^{-1}$ in the infrared spectrum was essentially gone. The polymer was heated to 182° C. before pouring out. The polymer had a measured percent solids (110° C./hour) of about 100%, an acid value of 80.0 mg KOH/g sample, and a hydroxyl value of 14.2 mg KOH/g sample. Gel permeation chromatography was used with tetrahydrofuran solvent and polystyrene standards to determine a weight average molecular weight of 15,047.

Polymer Example 4

A prepolymer was prepared by adding a total of 574.0 grams of pentaerythritol, 506.1 grams of 1,1,1-trimethylolethane, 1,410 grams of benzoic acid, 1,077.8 grams of isophthalic acid, 41.1 grams of xylene, and 4.5 grams of butylstannoic acid to a suitable reaction vessel equipped with a stirrer, temperature probe, and Dean-Stark trap with a condenser, under a nitrogen atmosphere. The contents of the reactor were gradually heated to 230° C. with continuous removal of water distillate beginning at about 173° C. The temperature of the reaction mixture was held at 230° C. until about 438 grams of water had been collected and the acid value of the prepolymer was <5 mg KOH/g sample. The reaction mixture was cooled to 190° C. and the xylene was then removed via vacuum distillation.

The contents of the reactor (the prepolymer) were cooled to 150° C. and 3.0 grams of triphenyl phosphite were added, followed by 707.9 grams of hexahydrophthalic anhydride to form a polymer. The reaction mixture was heated to 190° C. in stages over 3 hours, at which time the anhydride peak at 1,790 cm$^{-1}$ in the infrared spectrum was essentially gone. The polymer had a measured percent solids (150° C./hour) of about 97.5%, an acid value of 73.8 mg KOH/g sample, and a hydroxyl value of 23.2 mg KOH/g sample. Gel permeation chromatography was used with tetrahydrofuran solvent and polystyrene standards to determine a weight average molecular weight of 22,721.

Polymer Example 5

A prepolymer was prepared by adding a total of 1,050.3 grams of tris(2-hydroxyethyl)isocyanurate, 480.7 grams of 1,1,1-trimethylolethane, 835.2 grams of benzoic acid, 1,026.6 grams of isophthalic acid, 35.2 grams of xylene, and 4.8 grams of butylstannoic acid to a suitable reaction vessel equipped with a stirrer, temperature probe, and Dean-Stark trap with a condenser, under a nitrogen atmosphere. The contents of the reactor were gradually heated to 230° C. with continuous removal of water distillate beginning at about 179° C. The temperature of the reaction mixture was held at 230° C. until about 334 grams of water had been collected and the acid value of the prepolymer was 2.9 mg KOH/g sample. The reaction mixture was cooled to 190° C., 3.2 grams of triphenyl phosphite were added, and the xylene was then removed via vacuum distillation.

The contents of the reactor (the prepolymer) were cooled to 150° C. and 685 grams of hexahydrophthalic anhydride were added to form a polymer. The reaction mixture was heated to 160° C. over 3 hours, at which time the anhydride peak at 1,790 $cm^{-1}$ in the infrared spectrum was essentially gone. The polymer was heated to 190° C. before pouring out. The polymer had a measured percent solids (150° C./hour) of about 98.4%, an acid value of 68.0 mg KOH/g sample, and a hydroxyl value of 18.7 mg KOH/g sample. Gel permeation chromatography was used with tetrahydrofuran solvent and polystyrene standards to determine a weight average molecular weight of 9,485.

Polymer Example 6

A prepolymer was prepared by adding total of 669.2 grams of pentaerythritol, 124.7 grams of 1,3-propane diol, 1,074.9 grams of benzoic acid, 583.0 grams of isophthalic acid, 201.5 grams of 1,4-cyclohexane dicarboxylic acid, 35.2 grams of xylene, and 4.8 grams of butylstannoic acid to a suitable reaction vessel equipped with a stirrer, temperature probe, and Dean-Stark trap with a condenser, under a nitrogen atmosphere. The contents of the reactor were gradually heated to 230° C. with continuous removal of water distillate beginning at about 174° C. The temperature of the reaction mixture was held at 230° C. until about 328 grams of water had been collected and the acid value of the prepolymer was 3.5 mg KOH/g sample. The reaction mixture was cooled to 192° C. and the xylene was then removed via vacuum distillation.

The contents of the reactor (the prepolymer) were cooled to 150° C. and 3.2 grams of triphenyl phosphite were added, followed by 674.5 grams of hexahydrophthalic anhydride to form a polymer. The reaction mixture was held at 150° C. for 2.5 hours, at which time the anhydride peak at 1,790 $cm^{-1}$ in the infrared spectrum was essentially gone. The polymer was heated to 180° C. before pouring out. The polymer had a measured percent solids (150° C./hour) of about 94.5%, an acid value of 83.9 mg KOH/g sample, and a hydroxyl value of 16.6 mg KOH/g sample. Gel permeation chromatography was used with tetrahydrofuran solvent and polystyrene standards to determine a weight average molecular weight of 11,320.

Comparative Polymer Example 1

A total of 919 grams of tris(2-hydroxyehtyl)isocyanurate, 420.6 grams of 1,1,1-trimethylolethane, 730.8 grams of benzoic acid, 897.8 grams of isophthalic acid, 599.4 grams of HHPA, 30.8 grams of xylene, and 4.2 grams of butylstannoic acid were added to a suitable reaction vessel equipped with a stirrer, temperature probe, and Dean-Stark trap with a condenser, under a nitrogen atmosphere. The contents of the reactor were gradually heated to 230° C. with continuous removal of water distillate beginning at about 176° C. The temperature of the reaction mixture was held at 230° C. until about 305 grams of water had been collected at which point the reaction gelled and was discarded.

Table 1 shows the weight percent for the components used in Polymer Examples 1-6 and Comparative Polymer Example 1:

TABLE 1

| | Polymer Ex. 1 | Polymer Ex. 2 | Polymer Ex. 3 | Polymer Ex. 4 | Polymer Ex. 5 | Polymer Ex. 6 | Comparative Polymer Ex. 1 |
|---|---|---|---|---|---|---|---|
| Isophthalic acid | 22.62% | 30.06% | 21.71% | 25.21% | 25.18% | 17.51% | 25.17% |
| Benzoic Acid | 34.27% | 10.17% | 39.86% | 32.97% | 20.48% | 32.30% | 20.48% |
| Pentaerythritol | 21.25% | — | 24.91% | 13.42% | 25.75% | 20.11% | — |
| Trimethylolethane (TME) | — | — | — | 11.84% | 11.79% | — | 11.79% |
| Neopentyl glycol (NPG) | 1.99% | 9.40% | — | — | — | — | — |
| Tris (2-Hydroxyethyl) isocyanurate (THEIC) | — | 35.58% | — | — | — | — | 25.76% |
| 1,3 propanediol | — | — | — | — | — | 3.75% | — |
| 1,4-cyclohexanedicarboxylic acid (CDHA) | — | — | — | — | — | 6.06% | — |
| Hexahydrophthalic anhydride (HHPA) | 19.87% | — | — | 16.56% | 16.80% | 20.27% | 16.80% |
| Succinic anhydride | — | 14.79% | 12.95% | — | — | — | — |
| RESIFLOW ® LV[1] | — | — | 0.58% | — | — | — | — |

[1]Low viscosity acrylic polymer, commercially available from Estron Chemical Inc. (Calvert City, KY)

Table 2 below show various measured characteristics of the polymers from Polymer Examples 1-6.

TABLE 2

|  | Polymer Ex. 1 | Polymer Ex. 2 | Polymer Ex. 3 | Polymer Ex. 4 | Polymer Ex. 5 | Polymer Ex. 6 |
|---|---|---|---|---|---|---|
| % T.S.[2] | 99.7% | 97.9% | 100% | 97.5% | 98.4% | 94.5% |
| A.V. (theory)[3] | 82.8 | 87.1 | 81.0 | 67.1 | 66.7 | 80.6 |
| AV (measured)[4] | 84.7 | 84.9 | 80.0 | 73.8 | 68.0 | 83.9 |
| OH[5] | 18.1 | 7.9 | 14.2 | 23.2 | 18.7 | 16.6 |
| Tg[6] | 59° C. | 47° C. | 44° C. | 51° C. | 57° C. | 43° C. |
| Mw[7] | 10,917 | 19,703 | 15,047 | 22,721 | 9,485 | 11,320 |
| Mn[8] | 1,130 | 1,906 | 1,410 | 1,334 | 1,378 | 1,025 |
| Mz[9] | 49,837 | 85,957 | 94,734 | 146,574 | 34,472 | 53,844 |
| Pd[10] | 9.7 | 10.3 | 10.7 | 17.0 | 6.9 | 11.0 |

[2]% T.S. (percent total solids) was determined at 110° C. for 1 hour as described in ASTM D2369
[3]Theoretical acid value as calculated by 56,100/equivalent weight of acid. Equivalent weight of acid = grams of sample/equivalents of acid in sample
[4]Measured acid value was determined by ASTM D1639
[5]OH (Hydroxyl Number) was determined by ASTM D4274
[6]Glass transition temperature as measured by differential scanning calorimetry at a rate of 20° C./min at a temperature range from 0° C. to 175° C.
[7]Weight average molecular weight as measured by gel permeation chromatography with a tetrahydrofuran solvent and polystyrene standards
[8]Number average molecular weight as measured by gel permeation chromatography with a tetrahydrofuran solvent and polystyrene standards
[9]Z-average molecular weight as measured by gel permeation chromatography with a tetrahydrofuran solvent and polystyrene standards
[10]Polydispersity Index as measured by taking Mw/Mn For Comparative Example 1, the theoretical acid value was 55.7. No other data from Table 2 is available for Comparative Example 1 because, during preparation, all of the monomers were simultaneously added to the reactor and heated, resulting in gelation of the mixture. To avoid gelling, the hydroxyl functional polyester prepolymer may be prepared first, followed by capping with a non-aromatic anhydride to form a polymer having acid end groups.

Curable Coating Composition Comparative Examples 1-4 and Coating Composition Examples 1-11

Curable coating compositions were prepared from the components listed in Table 3 (Comparative Examples) and Table 4 (Inventive Examples) to form Comparative Coating Composition Examples 1-4 and Coating Composition Examples 1-11.

TABLE 3

| Component | Comparative CC Ex. 1 (gram) | Comparative CC Ex. 2 (gram) | Comparative CC Ex. 3 (gram) | Comparative CC Ex. 4 (gram) |
|---|---|---|---|---|
| Commercial Resin[11] | 91.1 | 92.6 | 92.4 | 91.1 |

TABLE 3-continued

| Component | Comparative CC Ex. 1 (gram) | Comparative CC Ex. 2 (gram) | Comparative CC Ex. 3 (gram) | Comparative CC Ex. 4 (gram) |
|---|---|---|---|---|
| RESIFLOW ® PL-200A[12] | 0.88 | 0.93 | 0.92 | 0.91 |
| Uraflow B[13] | 0.44 | 0.46 | 0.46 | 0.46 |
| HAA[14] | 4.79 | 4.61 | 4.59 | 4.53 |
| TGIC[15] | 0.00 | 0.00 | 0.00 | 0.00 |
| TINUVIN ® 144[16] | 0.96 | 0.00 | 0.00 | 0.91 |
| TINUVIN ® 405[17] | 0.48 | 0.00 | 0.00 | 0.00 |
| TINUVIN ® 900[18] | 0.00 | 0.00 | 0.00 | 0.46 |
| MONARCH ® 1300[19] | 1.36 | 1.37 | 1.66 | 1.64 |

[11]Uralac P800 polyester resin, commercially available from Koninklijke DSM N.V. (Heerlen, Netherlands)
[12]Acrylic/silica flow and leveling control agent, commercially available from Estron Chemical Inc. (Clavert City, KY)
[13]Benzoin, commercially available from Mitsubishi Chemical Corporation (Tokyo, Japan)
[14]Hydroxyalkylamide (HAA) crosslinker, Primid QM1260, commercially available from EMS-Griltech (Domat/Ems Switzerland)
[15]TGIC (triglycidyl isocyanurate), commercially available from Huntsman Corporation (The Woodlands, TX)
[16]Hindered amine light stabilizer, commercially available from BASF (Ludwigshafen, Germany)
[17]UV absorber, commercially available from BASF (Ludwigshafen, Germany)
[18]UV absorber, commercially available from BASF (Ludwigshafen, Germany)
[19]Carbon black, commercially available from Cabot Corporation (Boston, MA)

TABLE 4

| Component | CC Ex. 1 (gram) | CC Ex. 2 (gram) | CC Ex. 3 (gram) | CC Ex. 4 (gram) | CC Ex. 5 (gram) | CC Ex. 6 (gram) | CC Ex. 7 (gram) | CC Ex. 8 (gram) | CC Ex. 9 (gram) | CC Ex. 10 (gram) | CC Ex. 11 (gram) |
|---|---|---|---|---|---|---|---|---|---|---|---|
| Polymer Ex. 1 | 0.0 | 0.0 | 84.5 | 0.0 | 0.0 | 0.0 | 0.0 | 0.0 | 0.0 | 0.0 | 0.0 |
| Polymer Ex. 2 | 0.0 | 0.0 | 0.0 | 0.0 | 0.0 | 0.0 | 0.0 | 0.0 | 0.0 | 85.7 | 85.0 |
| Polymer Ex. 3 | 0.0 | 84.7 | 0.0 | 0.0 | 0.0 | 0.0 | 0.0 | 0.0 | 0.0 | 0.0 | 0.0 |
| Polymer Ex. 4 | 0.0 | 0.0 | 0.0 | 86.9 | 0.0 | 0.0 | 0.0 | 0.0 | 0.0 | 0.0 | 0.0 |
| Polymer Ex. 5 | 0.0 | 0.0 | 0.0 | 0.0 | 86.6 | 86.0 | 86.4 | 86.0 | 86.0 | 0.0 | 0.0 |
| Polymer Ex. 6 | 84.5 | 0.0 | 0.0 | 0.0 | 0.0 | 0.0 | 0.0 | 0.0 | 0.0 | 0.0 | 0.0 |

TABLE 4-continued

| Component | CC Ex. 1 (gram) | CC Ex. 2 (gram) | CC Ex. 3 (gram) | CC Ex. 4 (gram) | CC Ex. 5 (gram) | CC Ex. 6 (gram) | CC Ex. 7 (gram) | CC Ex. 8 (gram) | CC Ex. 9 (gram) | CC Ex. 10 (gram) | CC Ex. 11 (gram) |
|---|---|---|---|---|---|---|---|---|---|---|---|
| RESIFLOW ® PL-200A[12] | 0.84 | 0.85 | 0.84 | 0.87 | 0.87 | 0.86 | 0.0 | 0.0 | 0.0 | 0.86 | 0.85 |
| Uraflow B[13] | 0.42 | 0.42 | 0.42 | 0.43 | 0.43 | 0.43 | 0.86 | 0.86 | 0.86 | 0.43 | 0.43 |
| HAA[14] | 11.62 | 11.37 | 11.60 | 9.12 | 9.37 | 0.00 | 0.43 | 0.43 | 0.43 | 11.65 | 0.00 |
| TGIC[15] | 0.00 | 0.00 | 0.00 | 0.00 | 0.00 | 10.03 | 10.06 | 10.02 | 10.02 | 0.00 | 12.33 |
| TINUVIN ® 144[16] | 0.84 | 0.85 | 0.84 | 0.87 | 0.87 | 0.86 | 0.00 | 0.00 | 0.00 | 0.00 | 0.00 |
| TINUVIN ® 405[17] | 0.42 | 0.42 | 0.42 | 0.43 | 0.43 | 0.43 | 0.86 | 0.86 | 0.86 | 0.00 | 0.00 |
| TINUVIN ® 900[18] | 0.00 | 0.00 | 0.00 | 0.00 | 0.00 | 0.00 | 0.00 | 0.00 | 0.43 | 0.00 | 0.00 |
| MONARCH ® 1300[19] | 1.37 | 1.38 | 1.37 | 1.41 | 1.40 | 1.39 | 0.00 | 0.43 | 0.00 | 1.39 | 1.38 |

Each of the components listed in Tables 3 and 4 for Comparative Coating Composition Examples 1-4 and Coating Composition Examples 1-11 were weighed in a container and mixed in a prism high speed mixer for 30 seconds at 3500 RPM to form a dry homogeneous mixture. The mixture was then melt mixed in a Werner Pfleiderer 19 mm twin screw extruder with an aggressive screw configuration and a speed of 500 RPM. The first zone was set at 50° C., and the second, third, and fourth zones were set at 80° C. The feed rate was such that a torque of 50-60% was observed on the equipment. The mixtures were dropped onto a set of chill rolls to cool and re-solidify the mixtures into solid chips. The chips were ground in a Mikro ACM®-1 Air Classifying Mill to obtain a particle size of 5 to 150 microns with a majority of the particles being from 20 to 40 microns. The resulting coating compositions for Comparative Coating Composition Examples 1-4 and Coating Composition Examples 1-11 were solid particulate powder coating compositions that were free flowing.

Each of the coatings prepared from the compositions of Comparative Coating Composition Examples 1-4 and Coating Composition Examples 1-11 were evaluated for UV durability by way of accelerated weathering per SAE J2527. The Weather-Ometer was set to SAE J2527 parameters with daylight filters. The results of the UV durability testing for Comparative Coating Composition Examples 1-4 and Coating Composition Examples 1-11 are shown in Table 5 (Comparative Examples) and Table 6 (Inventive Examples) below.

TABLE 5

| Component | Comparative CC Ex. 1 | Comparative CC Ex. 2 | Comparative CC Ex. 3 | Comparative CC Ex. 4 |
|---|---|---|---|---|
| Gloss, 60 degree | 96 | 96 | 96 | 96 |
| Gloss, 20 degree | 92 | 91 | 90 | 91 |
| % Gloss retention at 4,000 h WOM[20] | 92 | 72 | 80 | 89 |
| % Gloss retention at 5,000 h WOM[20] | 49 | 59 | 51 | 61 |

[20]Atlas Weather-Ometer per SAE J2527 with daylight filters; data reported as % gloss retention (at 20 degree gloss measurement)

TABLE 6

| Component | CC Ex. 1 | CC Ex. 2 | CC Ex. 3 | CC Ex. 4 | CC Ex. 5 | CC Ex. 6 | CC Ex. 7 | CC Ex. 8 | CC Ex. 9 | CC Ex. 10 | CC Ex. 11 |
|---|---|---|---|---|---|---|---|---|---|---|---|
| Gloss, 60 degree | 97 | 99 | 98 | 97 | 99 | 98 | 100 | 99 | 99 | 97 | 98 |
| Gloss, 20 degree | 82 | 91 | 85 | 77 | 93 | 93 | 98 | 98 | 96 | 94 | 92 |
| % Gloss retention at 4,000 h WOM[20] | 94 | 91 | 90 | 87 | 100 | 100 | 93 | 90 | 89 | 98 | 92 |
| % Gloss retention at 5,000 h WOM[20] | 93 | 86 | 51 | 66 | 98 | 99 | 84 | 88 | 84 | 94 | 87 |

As shown in Tables 5 and 6, the coatings prepared from Coating Composition Examples 1-11 all exhibited improved UV durability over the commercial ultradurable polyester (Comparative Coating Composition Examples 1-4) at either 4,000 h WOM or 5,000 h WOM resin as measured by % gloss retention of the coating after exposure to Xe-arc Weather-Ometer. In particular, differentiation is observed after extended exposure (5,000 hours).

The present invention further includes the subject matter of the following clauses.

Clause 1: A coating composition comprising: a polymer prepared from a reaction mixture comprising: (i) a hydroxyl functional prepolymer comprising a reaction product of a prepolymer mixture comprising: (A) (a) a polyol having at least three hydroxyl groups; (b) benzoic acid or substituted benzoic acid; and (c) a polyacid, ester or anhydride thereof; or (B) (d) the reaction product of (a) a polyol having at least three hydroxyl groups with (b) benzoic acid or substituted benzoic acid; and (c) a polyacid, ester or anhydride thereof; or (C) (e) the reaction product of (a) a polyol having at least three hydroxyl groups with (c) a polyacid, ester or anhydride thereof; and (b) benzoic acid or substituted benzoic acid; and (ii) a non-aromatic anhydride, wherein the polymer comprises at least two functional groups selected from hydroxyl groups, carboxyl groups and combinations thereof and wherein the polymer comprises 10-40 weight % of structural units derived from component (b) and greater than 15 weight % of structural units derived from component (a) based on the total weight of the polymer.

Clause 2: The coating composition of clause 1, wherein the polymer comprises 10-25 weight % of structural units derived from reactant (ii) based on the total weight of the polymer.

Clause 3: The coating composition of any of the preceding clauses, wherein an amount of reactant (ii) is added to the reaction mixture, such that at least 35% of free hydroxyl groups in the prepolymer react with the reactant (ii).

Clause 4: The coating composition of any of the preceding clauses, wherein the polymer comprises at least 20 weight % of structural units derived from component (a) based on the total weight of the polymer.

Clause 5: The coating composition of clause 4, wherein the polymer comprises 20-75 weight % of structural units derived from component (a) based on the total weight of the polymer.

Clause 6: The coating composition of clause 4, wherein the polymer comprises 20-60 weight % of structural units derived from component (a) based on the total weight of the polymer.

Clause 7: The coating composition of any of the preceding clauses, wherein the polymer comprises 20-40 weight % of structural units derived from component (b) based on the total weight of the polymer.

Clause 8: The coating composition of any of the preceding clauses, wherein the polymer comprises 15-30 weight % of structural units derived from component (c) based on the total weight of the polymer.

Clause 9: The coating composition of any of the preceding clauses, wherein component (a) comprises: pentaerythritol, trimethylolethane (TME), trimethylolpropane (TMP), tris(2-hydroxyethyl)isocyanurate (THEIC), and/or mixtures thereof.

Clause 10: The coating composition of any of the preceding clauses, wherein component (c) and component (ii) are different.

Clause 11: The coating composition of any of the preceding clauses, wherein the polyacid comprises: isophthalic acid, adipic acid, azelaic acid, sebacic acid, succinic acid, glutaric acid, decanoic diacid, dodecanoic diacid, cyclohexanedioic acid, hydrogenated C36 dimer fatty acids, esters or anhydrides thereof, and/or mixtures thereof.

Clause 12: The coating composition of any of the preceding clauses, wherein reactant (ii) comprises: hexahydrophthalic anhydride (HHPA), succinic anhydride, methyl HHPA, and/or maleic anhydride.

Clause 13: The coating composition of any of the preceding clauses, wherein the polymer has a weight average molecular weight (Mw) of 5,000-25,000

Clause 14: The coating composition of any of clauses 1-13, wherein the polymer has a weight average molecular weight (Mw) of 6,000-25,000.

Clause 15: The coating composition of any of clauses 1-13, wherein the polymer has a weight average molecular weight (Mw) of 9,000-23,000.

Clause 16: The coating composition of any of clauses 1-13, wherein the polymer has a weight average molecular weight (Mw) of 7,000-25,000.

Clause 17: The coating composition of any of the preceding clauses, wherein the polymer is branched.

Clause 18: The coating composition of any of the preceding clauses, wherein the reaction mixture does not comprise trimellitic acid, phthalic acid, terephthalic acid, pyromelletic acid, trimesic acid, naphthalene dicarboxylic acid and substitutions thereof, esters or anhydrides thereof, and/or mixtures thereof.

Clause 19: The coating composition of any of the preceding clauses, further comprising a cross-linker.

Clause 20: The coating composition of clause 19, wherein the cross-linker comprises hydroxyl alkyl amides, tris-glyciylisocyanurate (TGIC), glycolurils, glycidyl methacrylate (GMA) acrylic, epoxy resins, aminoplast resins, oxazoline, blocked isocyanates, and/or mixtures thereof.

Clause 21: The coating composition of clause 20, wherein the cross-linker comprises TGIC and/or N,N,N'N'-tetrakis (2-hydroxyethyl) hexanediamide.

Clause 22: The coating composition of any of the preceding clauses, wherein, when applied to a substrate and cured to form a coating, the coating exhibits a gloss retention of at least 90% at 4000 h according to SAE Standard J2527.

Clause 23: The coating composition of any of the preceding clauses, wherein, when applied to a substrate and cured to form a coating, the coating exhibits a gloss retention of at least 50% at 5000 h according to SAE Standard J2527.

Clause 24: The coating composition of any of the preceding clauses, wherein the coating composition is a powder coating composition.

Clause 25: The coating composition of any of the preceding clauses, wherein the prepolymer comprises a free hydroxyl group, wherein the reactant (ii) reacts with the free hydroxyl group.

Clause 26: The coating composition of any of the preceding clauses, wherein the polymer is acid functional Clause 27: A substrate at least partially coated with the coating composition of any of the preceding clauses.

Clause 28: The substrate of clause 27, wherein the substrate comprises metal.

Clause 29: A method of preparing a coating composition comprising: mixing a hydroxyl functional prepolymer (i) comprising a reaction product of a prepolymer mixture comprising: (A) (a) a polyol having at least three hydroxyl groups; (b) benzoic acid or substituted benzoic acid; and (c) a polyacid, ester or anhydride thereof; or (B) (d) the reaction product of (a) a polyol having at least three hydroxyl groups with (b) benzoic acid or substituted benzoic acid; and (c) a polyacid; or (C) (e) the reaction product of (a) a polyol having at least three hydroxyl groups with (c) a polyacid, ester or anhydride thereof; and (b) benzoic acid or substituted benzoic acid; with a non-aromatic anhydride (ii) to form a polymer comprising at least two functional groups selected from hydroxyl groups, carboxyl groups and combinations thereof and 10-40 weight % of structural units derived from component (b) and greater than 15 weight % of structural units derived from component (a) based on the total weight of the polymer.

Clause 30: The method of clause 29, wherein the prepolymer comprises one or more free hydroxyls group, wherein the non-aromatic anhydride reacts with the one or more free hydroxyl groups.

Whereas particular embodiments of this invention have been described above for purposes of illustration, it will be evident to those skilled in the art that numerous variations of the details of the present invention may be made without departing from the invention as defined in the appended claims.

The invention claimed is:

1. A powder coating composition comprising: a polymer prepared from a reaction mixture comprising:
(i) a hydroxyl functional prepolymer comprising a reaction product of a prepolymer mixture comprising:

(A) (a) a polyol having at least three hydroxyl groups;
(b) benzoic acid or substituted benzoic acid; and
(c) a polyacid, ester or anhydride thereof; or
(B) (d) the reaction product of (a) a polyol having at least three hydroxyl groups with (b) benzoic acid or substituted benzoic acid; and
(c) a polyacid, ester or anhydride thereof; or
(C) (e) the reaction product of (a) a polyol having at least three hydroxyl groups with (c) a polyacid, ester or anhydride thereof; and
(b) benzoic acid or substituted benzoic acid; and
(ii) a non-aromatic anhydride,
wherein the polymer comprises at least two functional groups selected from hydroxyl groups, carboxyl groups and combinations thereof and wherein the polymer comprises 10-40 weight % of structural units derived from component (b) and greater than 15 weight % of structural units derived from component (a) based on the total weight of the polymer;
wherein the coating composition is a powder coating composition; and
wherein the coating composition further comprises a cross-linker.

2. The powder coating composition of claim 1, wherein the polymer comprises 10-25 weight % of structural units derived from reactant (ii) based on the total weight of the polymer.

3. The powder coating composition of claim 1, wherein an amount of reactant (ii) is added to the reaction mixture, such that at least 35% of free hydroxyl groups in the prepolymer react with the reactant (ii).

4. The powder coating composition of claim 1, wherein the polymer comprises at least 20 weight % of structural units derived from component (a) based on the total weight of the polymer.

5. The powder coating composition of claim 1, wherein the polymer comprises 20-40 weight % of structural units derived from component (b) based on the total weight of the polymer.

6. The powder coating composition of claim 1, wherein the polymer comprises 15-30 weight % of structural units derived from component (c) based on the total weight of the polymer.

7. The powder coating composition of claim 1, wherein component (a) comprises: pentaerythritol, trimethylolethane (TME), trimethylolpropane (TMP), tris(2-hydroxyethyl)isocyanurate (THEIC), and/or mixtures thereof.

8. The powder coating composition of claim 1, wherein component (c) and component (ii) are different.

9. The powder coating composition of claim 1, wherein the polyacid comprises: isophthalic acid, adipic acid, azelaic acid, sebacic acid, succinic acid, glutaric acid, decanoic diacid, dodecanoic diacid, cyclohexanedioic acid, hydrogenated C36 dimer fatty acids, esters or anhydrides thereof, and/or mixtures thereof.

10. The powder coating composition of claim 1, wherein reactant (ii) comprises: hexahydrophthalic anhydride (HHPA), succinic anhydride, methyl HHPA, and/or maleic anhydride.

11. The powder coating composition of claim 1, wherein the polymer has a weight average molecular weight (Mw) of 5,000-25,000.

12. The powder coating composition of claim 1, wherein the polymer is branched.

13. The powder coating composition of claim 1, wherein, when applied to a substrate and cured to form a coating, the coating exhibits a gloss retention of at least 90% at 4000 h according to SAE Standard J2527.

14. The powder coating composition of claim 1, wherein the polymer is acid functional.

15. The powder coating composition claim 1, wherein the reaction mixture does not comprise trimellitic acid, phthalic acid, terephthalic acid, pyromelletic acid, trimesic acid, naphthalene dicarboxylic acid and substitutions thereof, esters or anhydrides thereof, and/or mixtures thereof.

16. A substrate at least partially coated with the powder coating composition of claim 1.

17. The substrate of claim 16, wherein the substrate comprises metal.

18. A method of preparing a powder coating composition comprising:
mixing a hydroxyl functional prepolymer (i) comprising a reaction product of a prepolymer mixture comprising:
(A) (a) a polyol having at least three hydroxyl groups;
(b) benzoic acid or substituted benzoic acid; and
(c) a polyacid, ester or anhydride thereof; or
(B) (d) the reaction product of (a) a polyol having at least three hydroxyl groups with (b) benzoic acid or substituted benzoic acid; and
(c) a polyacid; or
(C) (e) the reaction product of (a) a polyol having at least three hydroxyl groups with (c) a polyacid, ester or anhydride thereof; and
(b) benzoic acid or substituted benzoic acid;
with a non-aromatic anhydride (ii) to form a polymer comprising at least two functional groups selected from hydroxyl groups, carboxyl groups and combinations thereof and 10-40 weight % of structural units derived from component (b) and greater than 15 weight % of structural units derived from component (a) based on the total weight of the polymer;
wherein the coating composition further comprises a cross-linker.

* * * * *